Sept. 17, 1940.   D. F. WARNER   2,215,306
PRESSURE REGULATING SYSTEM
Filed Feb. 5, 1938

Inventor:
Donald F. Warner,
by Harry E. Dunham
His Attorney.

Patented Sept. 17, 1940

2,215,306

UNITED STATES PATENT OFFICE 2,215,306

PRESSURE REGULATING SYSTEM

Donald F. Warner, Swampscott, Mass., assignor to General Electric Company, a corporation of New York Application February 5, 1938, Serial No. 188,907

7 Claims. (Cl. 137—158)

This invention relates to pressure regulating apparatus, more specifically to apparatus for governing the supply of elastic fluid to a system in accordance with the condition of pressure obtaining in the elastic fluid system.

In systems which supply elastic fluid, such as steam, for industrial uses it is frequently desirable to maintain constant the pressure in such a system which may be accomplished by regulating a valve controlling the supply of elastic fluid thereto. In the case where a quantity of elastic fluid is to be supplied to a low pressure system from a system of higher pressure, a suitable pressure reducing device such as a turbine may be provided for utilizing the pressure drop, the inlet valves to such turbine being controlled in accordance with the pressure obtaining in the exhaust of the turbine feeding the low pressure system.

It is an object of this invention to provide improved apparatus for regulating the supply of elastic fluid to an elastic fluid system so as to maintain the pressure therein at a predetermined constant value.

It is a further object of this invention to provide improved apparatus for regulating the inlet valve to a series turbine in such a manner that a predetermined constant value of pressure is maintained in the exhaust conduit which apparatus is simple in design and inexpensive to manufacture.

For a consideration of what I believe to be novel and my invention, attention is directed to the following description and the claims appended thereto in connection with the accompanying drawing.

Figure 1:
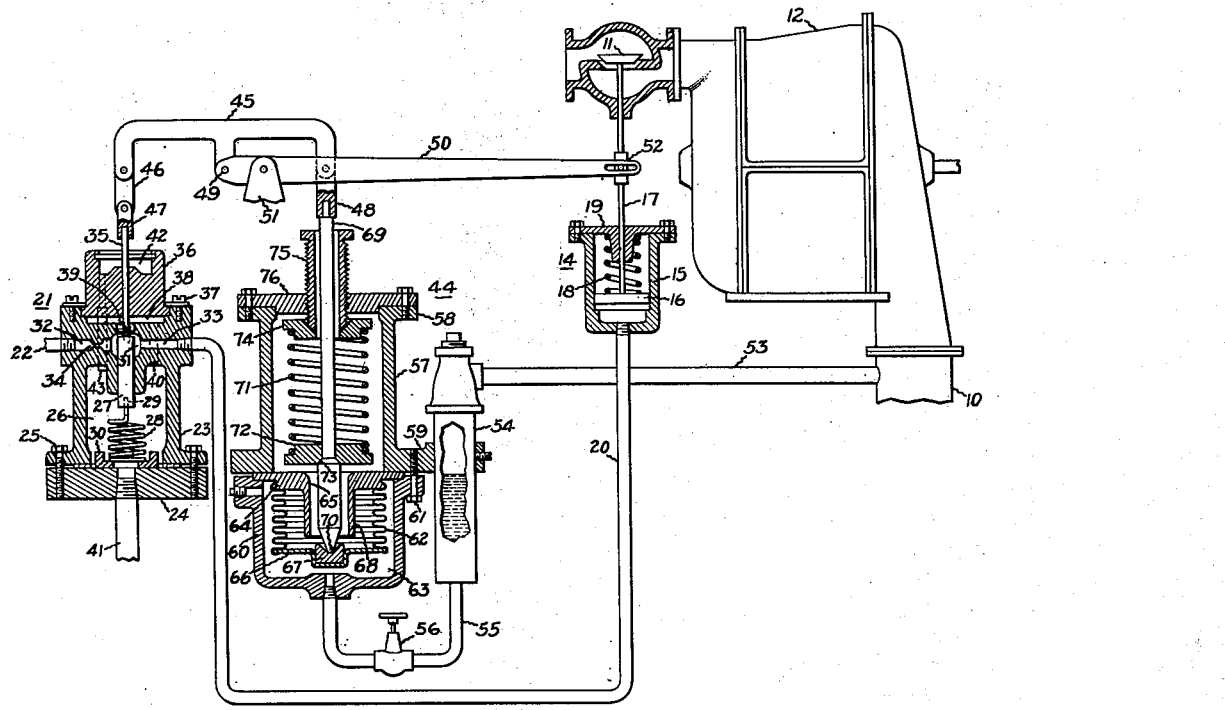
Figure 2:
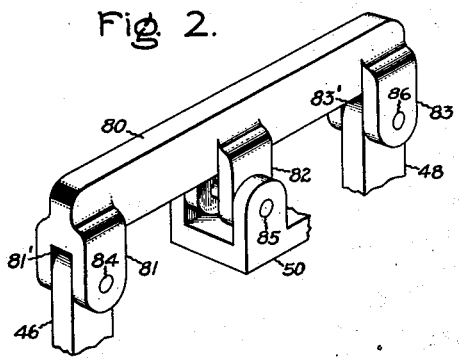

In the drawing, Fig. 1 is a view of a turbine provided with a pressure regulating mechanism embodying my invention and Fig. 2 shows a modified form of a floating lever of Fig. 1.

Referring to Fig. 1 of the drawing, one form of my invention is shown in which the pressure of elastic fluid is maintained constant in a conduit 10, which supplies elastic fluid to a system (not shown), by the regulation of a valve 11 controlling the supply thereto. The pressure drop between the supply conduit and the conduit 10 is utilized by a turbine 12 connected to any suitable load. It is understood, however, that any other form of pressure reducing device may be used in lieu of the turbine shown or that valve 11 may be of any suitable pressure reducing type in which latter case the turbine 12 or similar piece of apparatus may be dispensed with.

The valve 11 is controlled by a hydraulic motor 14 having a cylinder 15 and a piston 16 mounted therein which is operatively connected to the valve stem 17. The piston 16 is biased to its lowermost position, corresponding to the closed position of the valve 11, by means of a spring 18 arranged between the piston and the head 19 of the motor. Operating fluid for the motor 14 is supplied to a chamber below the piston 16 through a conduit 20, the pressure in which is regulated by means of a pilot valve device 21 provided between the operating fluid supply conduit 22 and the conduit 20. The pilot valve device 21 comprises a housing 23 having a flanged lower portion to which is secured a base plate 24 as by screws 25 forming a chamber 26. The upper end or head of the housing is provided with a cylinder, extending therethrough, having a valve 27 slidably arranged therein. The valve 27 is biased to a closed or uppermost position by means of a spring 28, the upper end of which is adapted to seat in a small hole 29 drilled in the lower end of the valve 27. The lower end of the spring rests within an annular collar 30 secured to the base plate 24. An annular passage 31 is provided in the side wall of the cylinder and forms a continuous passage around the valve 27 between the conduits 22 and 20, which communicate therewith by means of passages 32 and 33, respectively, provided in the head of the housing. An orifice 34 is provided in the passage 32 for restricting the rate of flow of fluid therethrough. A stem 35 adapted to engage loosely the upper end of the valve 27 is mounted for slidable movement within a guide block 36 which is in turn secured to the upper end of housing 23 as by screws 37, forming a small chamber 38 therebetween. The valve 27, being normally biased to the upper position, is adapted to extend through the chamber 31 and through the upper end 39 of the cylinder in which position, fluid under full pressure will pass from conduit 22 through the chamber 31 around the valve 27 and through the conduit 20 to the motor 14. The valve is shown in a partly opened position in which a force applied to the stem 35, has moved the valve 27 downwardly, the upper end thereof being slightly clear of the cylinder portion 39. In this position of the valve, the operating fluid pressure will be decreased since a certain amount of fluid will be allowed to drain from the chamber 31 past the upper end of the valve 27, through the upper end 39 of the cylinder and into the chamber 38. A passage 40 through the housing, connecting chambers 38 and 26, provides a drain for fluid by-passed from the chamber 31, from which it flows through the drain conduit 41. Any fluid which may leak past the actuator stem 35 passes into a chamber 42 provided in the upper end of the guide block 36 from which it is returned through a passage 43 extending therefrom into the lower chamber 26.

The pilot valve is actuated in accordance with variations in pressure obtaining in the conduit 10 by means of a pressure responsive device 44 to which the pilot valve is connected through a floating lever 45. The floating lever 45 is connected at its left end by means of a pivoted link 46 and an element 47 with the pilot valve stem 35, the end of the stem being loosely seated in a socket formed in the end of the element 47. The right end of the floating lever is connected to the pressure responsive device by means of a connecting element 48 which is also provided with a socket in the end thereof for loose engagement with an actuator stem extending from the device 44. The floating lever is pivoted intermediate its ends, as at 49, to an end of an arm 50 fulcrumed on a stationary part 51, the other end of which is operatively connected to the valve stem 17 for movement therewith as by a pin and slot arrangement 52.

The connection between the pressure responsive device 44 and the elastic fluid system 10 includes a conduit 53 which extends from the conduit 10 and communicates with the upper part of a cylinder 54 which is partially filled with a suitable pressure transmitting fluid such as water. The lower portion of the cylinder 54 communicates by a conduit 55 with the pressure responsive actuating device 44, a valve 56 being placed in the conduit for regulating the rate of flow of the liquid therethrough. The pressure responsive actuating device 44 comprises a cylindrical casing 57 provided with flanged portions 58 and 59 at the upper and lower ends thereof respectively. To the lower flange 59 a cup shaped member 60 is secured, as by screws 61. A pressure responsive element such as an expansible bellows arrangement 62 is mounted within the cup forming a closed chamber 63 therebetween, the upper end of the bellows being sealed, as by soldering, to a shoulder 64 of an apertured disk member 65, the outer rim of which is clamped between the flange 59 and the cup 60. The lower end of the bellows is sealed, as by soldering, to an end plate 66 which in turn is provided with a bearing block 67 arranged within a depression in the central portion thereof. The compression of the expansible bellows is limited by a cylindrical extension 68 depending from the disk member 65 which is adapted to be engaged by the end wall 66 upon a predetermined compression of the bellows. The actuator stem 69 has a bearing tip 70 at the lower end thereof seated within a depression in the upper surface of the bearing block 67. The actuator stem is retained in position by means of a spring 71 arranged within the casing 57, the lower end of which bears against the collar 72 seated upon a shoulder 73 formed on the stem 69. The upper end of the spring 71 is retained by a collar 74 which is adapted to be adjusted by means of the bushing 75 threaded in the cap 76 secured to the casing 57. By adjusting the compression of the spring 71, the controlling pressure of the device can be regulated.

The operation of the device will now be described as follows: assume that elastic fluid is being supplied to the system conduit 10 and that due to some reason, such as a decrease in demand for elastic fluid, the pressure obtaining in the conduit 10 is increased. Such increase of pressure is communicated to the water level in the cylinder 54 and in turn causes a corresponding compression of the bellows 62. By a proper adjustment of the valve 56 the rate of response of the device 44 can be varied to prevent temporary pulsations of pressure in the conduit 10 from operating the control apparatus. As the stem 69 is moved upwardly by the compression of the bellows, the floating lever 45 is rotated in a counterclockwise direction to force the valve 27 downwardly, widening the opening between the annular chamber 31 and the upper portion 39 of the cylinder allowing a greater quantity of fluid to be by-passed therethrough into the chamber 38, through the drain 40 and out through conduit 41. The accompanying decrease in pressure-head on the fluid in the conduit 20 allows fluid to be forced from the cylinder 15, due to the biasing action of spring 18, which in turn causes movement of the valve 11 toward a more closed position to reduce the supply of elastic fluid to the turbine. Movement of the valve stem 17 rotates the lever 50 connected thereto in a clockwise direction raising the pivotal support 49 for the floating lever 45. Since the floating lever is normally biased for movement in a clockwise rotation, due to the spring 28, upward movement of the pivotal support 49 is accompanied by a clockwise rotation of the floating lever pivoting about its right end and a movement of the valve 27 toward a slightly more closed position. This movement of the valve 27 causes a slight increase of pressure in the chamber 31 which causes a corresponding flow of fluid into the cylinder of the motor 14. The valve 11 will be moved to a slightly more opened position and due to the interconnection of lever 50 between the valve stem 17 and the floating lever 45, the valve 11 will be stabilized for the new condition of diminished flow required for maintaining the predetermined constant pressure in the system conduit 10. In the event that for any reason, such as an increase in demand for elastic fluid, the pressure obtaining in the conduit 10 should decrease, the reverse operation of the apparatus will take place to adjust the valve 11 to a more opened position.

It will be noted that due to the biasing action of spring 28 in the pilot valve 21, no fast connections are required between the spring 28 and the valve 27, and between the valve 27 and the stem 35. Further, only pin and socket connections are necessary between the stems 35 and 69 and the connecting links pivotally secured to the floating lever 45. By this arrangement of elements, the construction of the apparatus is greatly simplified and costs materially reduced, the assembly of the apparatus greatly facilitated and the parts made more readily removable for replacement or repair.

In Fig. 2 I have shown a simplified construction for a floating lever which may be used in the above apparatus in place of the floating lever 45 shown in Fig. 1. This lever comprises a longitudinal bar 80 of any suitable metal, which is provided at one edge with extending lugs 81, 82 and 83 suitably spaced apart. If the bar 80 is cast, these lugs may be cast integrally with the bar 80 and with a single pass of a gang of milling cutters finished surfaces may be provided in the slots 81' and 83' for receiving the ends of the connecting links 46 and 48 and also finished surfaces on the exterior of the lug 82 for fitting onto the pilot valve return lever 50. Suitable holes 84, 85 and 86 may be drilled through the lug portions for receiving retaining pins or bolts as desired. According to this construction, but single milling and drilling operations are required, resulting in a substantial saving in manufacturing costs for this item. Since the fitting surfaces are all finished at a single machine set-up, a true alignment of the connecting parts is facilitated.

While I have shown and described this pressure regulating apparatus as embodied in a system in which the pressure of elastic fluid therein is maintained at a predetermined constant value by the regulation of a valve controlling the supply of elastic fluid to an elastic fluid turbine arranged in series therebetween, it is obvious that my apparatus is adaptable for other uses. For example, in a pumping system the pressure obtaining on the exhaust side of the pump may be regulated by the adjustment of the pump inlet valves in much the same manner as described above. Also, if elastic fluid is to be supplied from an extraction stage of a turbine, the system pressure may be regulated by controlling the turbine extraction stage valves.

Having described the method of operation of my invention together with the apparatus which I now consider to represent the best embodiment thereof, I desire to have it understood that the apparatus and application shown are only illustrative and that the invention may be carried out by other means.

What I claim as new and desire to secure by Letters Patent of the United States is:

1. In an elastic fluid pressure regulator, the combination comprising operating means, a conduit for conveying operating fluid under pressure to said operating means, a valve arranged in said conduit for by-passing liquid from said conduit to vary the pressure of fluid supplied to said operating means, means biasing said valve to the closed position, an element responsive to the elastic fluid pressure to be regulated, a stem in engagement with said element, a floating lever operatively connecting said valve and said stem whereby said pressure responsive element is biased in opposition to the elastic fluid pressure by said biasing means, a pivoted lever supporting said floating lever intermediate the connections with said stem and said valve, and means so connecting said lever and said operating means that said valve is adjusted in accordance with movements of said operating means in a reverse direction as regards the preceding adjustment thereof by said element.

2. In elastic fluid pressure regulating apparatus, the combination comprising operating means, a conduit for conveying operating fluid under pressure to said operating means, a valve arranged in said conduit for draining fluid from said conduit to vary the pressure of fluid supplied to said operating means, means biasing said valve to the closed position, a stem adapted to loosely engage said valve, guide means for said stem, an element responsive to the elastic fluid pressure to be regulated, a stem adapted to loosely engage with said element, a floating lever, means including loose pin and socket connections between the opposite ends of said floating lever and said stems whereby said valve is actuated against said biasing means by said element, a pivoted lever supporting said floating lever intermediate its ends and operatively connected to said operating means so that said valve is adjusted in accordance with movements of said operating means in a reverse direction as regards the preceding adjustment thereof by said element.

3. In elastic fluid pressure regulating apparatus, the combination comprising operating means, a conduit for conveying operating fluid under pressure to said operating means, a cylinder in communication with said conduit, a co-operating cylindrical valve slidably arranged in said cylinder, means biasing said valve to one end of said cylinder, a stem adapted to engage one end of said valve for moving it against said biasing means to establish a by-pass for fluid in said conduit, an element responsive to the elastic fluid pressure to be regulated, a stem adapted to engage with said element, a floating lever, means operatively connecting the opposite ends of said floating lever to said stems whereby said valve is actuated against said biasing means by said element, a pivoted lever supporting said floating lever intermediate its ends and operatively connected to said operating means so that said valve is adjusted in accordance with movements of said operating means in a reverse direction as regards the preceding adjustment thereof by said element.

4. Apparatus for regulating elastic fluid turbine admission valves in accordance with the turbine exhaust pressure comprising the combination of a valve operating motor biased in the valve closing direction, conduit means for supplying operating pressure fluid to said motor in the valve opening direction, a port in said conduit means for by-passing pressure fluid therefrom, a longitudinally slidable member aligned with said port and adapted to pass therethrough substantially closing said port, turbine exhaust pressure responsive means, a lever pivoted intermediate its ends adapted to be connected at one end in an operative relationship with said motor, said lever supporting at its other end a second lever intermediate its ends, the ends of said second lever connecting said member and said pressure responsive means, and means acting against said member in the port closing direction for exerting a biasing force through said second lever against said pressure responsive means.

5. Regulating means for a pressure fluid operated elastic fluid turbine admission valve comprising the combination of a valve operating motor normally biased to the valve closing condition, a source of operating fluid under a substantially constant pressure, conduit means for conducting pressure fluid from said source to said motor for moving it in the valve opening direction, a normally open port in said conduit means, a member for cooperating with said port for regulating the escape of fluid therefrom and adjusting the pressure of operating fluid supplied to said motor, an actuator stem loosely engaging said member for moving said member to the port opening position, an actuating stem, a pivoted lever loosely engaging the ends of said stems, means acting against said member in the port closing direction thereof for exerting a biasing force against said actuator stem and through said lever to said actuating stem, condition responsive means for normally exerting a continuous regulating force against said actuating stem in opposition to said biasing force whereby the opening of said port is varied for adjusting the motor operating fluid pressure and a second lever operatively connected to said motor and pivotally supporting said first lever whereby said port is secondarily adjusted in accordance with changes in motor condition.

6. Apparatus for regulating an elastic fluid pressure controlling valve of the fluid pressure operated type comprising the combination of a valve operating motor normally biased to the valve closing position, conduit means for supplying operating pressure fluid to said motor, a normally open port in said conduit means for by-passing pressure fluid therefrom, a longitudinally slidable member aligned with said port and adapted to pass therethrough substantially closing said port, means biasing said member to the port closing position, an actuator stem for engaging and actuating said member to the port opening position in opposition to said biasing means, elastic fluid pressure responsive means including an actuating stem, lever means for transmitting the movement of said actuating stem to said actuator stem against the force of said member biasing means to adjust the port opening position of said member, and means connecting said lever means and said motor so that said member is adjusted in accordance with movements of said motor in a reverse direction as regards the preceding adjustment thereof by said element.

7. A pressure regulating valve comprising a housing having a cylinder, an annular chamber in the side wall of the cylinder, inlet and outlet passages for operating fluid communicating with the chamber, a bleed port communicating with the annular chamber, a cylindrical valve head slidably arranged in the cylinder to vary the flow of fluid from the bleed port, means loosely engaging one end of the valve head for biasing the head in one direction and a stem loosely engaging the other end of the valve head for actuating the head against the biasing means.

DONALD F. WARNER.